United States Patent

Elam, Jr. et al.

[11] Patent Number: 5,823,653
[45] Date of Patent: Oct. 20, 1998

[54] BICYCLE ILLUMINATION SYSTEM

[76] Inventors: Walter Thomas Elam, Jr., 487 S. Sanford, Pontiac, Mich. 48342; Antoine L. Jones, 4666 Julius Blvd., Westland, Mich. 48186

[21] Appl. No.: 915,264

[22] Filed: Aug. 20, 1997

[51] Int. Cl.$^6$ ........................................................ B62J 6/00
[52] U.S. Cl. ........................... 362/72; 362/84; 362/249
[58] Field of Search ............................ 362/61, 72, 80, 362/84, 249, 252, 191; 340/432

[56] References Cited

U.S. PATENT DOCUMENTS

| | | | |
|---|---|---|---|
| D. 360,957 | 8/1995 | Lerner | D26/28 |
| 4,088,882 | 5/1978 | Lewis | 362/217 |
| 4,319,307 | 3/1982 | Turner | 362/72 |
| 4,901,209 | 2/1990 | Nitz | 362/72 |
| 5,008,782 | 4/1991 | Murray | 362/72 |
| 5,711,595 | 1/1998 | Gerbe | 362/84 |

*Primary Examiner*—Thomas M. Sember
*Attorney, Agent, or Firm*—Goldstein & Canino

[57] ABSTRACT

A bicycle illumination system to accentuate and make visible during periods of low light the details and contours of a bicycle frame. The system comprises a plurality of neon light tubes affixed to various members of the bicycle frame so that the outline of the frame is clearly delineated during low light periods and hence visible to proximal motorists. The system further contemplates a phosphorescent coating applied to the bicycle frame to assist the neon light tubes in accentuating the bicycle frame.

2 Claims, 3 Drawing Sheets

BICYCLE ILLUMINATION SYSTEM

BACKGROUND OF THE INVENTION

The invention relates to a bicycle illumination system. More particularly, the invention relates to a device that allows a bicycle to be visible during dusk and the nighttime hours.

With the increased desire to exercise and stay in good shape, more and more people are turning to bicycle riding as an enjoyable source of exercise. Further, bicycles are as popular as ever among the younger generation.

Adults, in particular, are often forced to ride their bicycles in the evening hours since their work schedules usually occupy the majority of the daylight hours. Further, during the summer months, it is preferable to ride a bicycle at night since it is usually cooler, and therefore more enjoyable. Children, as well teenagers, often find themselves on their bicycles at night since it is their best mode of transportation.

With the increased popularity of the sport, the number of bicycle-related accidents has also grown, most involving automobiles at night. The principle reason for the accidents is the poor visibility of the bicycles by the automobile driver. While reflectors added to the design of the bicycle are a marked improvement, many drivers do not detect the bicycle in enough time to avoid the accident. Children in particular are prone to accidents since most children do not concern themselves with the traffic around them.

There is a need for high visibility of bicycles. If cyclists were more visible to other people on the road, many accidents could be prevented, thereby avoiding injuries and lives.

U.S. Pat. No. 4,901,209 to Nitz discloses an illuminated bicycle frame formed of hollow tubular members that allow light to be transmitted through their side walls. While this invention may provide better visibility to a bicycle during the night hours, the high cost of such a bicycle would deter many people from purchasing said bicycle.

U.S. Pat. No. 4,319,307 to Turner discloses an illuminated handlebar mountable to a bicycle frame. While this invention, may provide some visibility to the cyclist, it fails to distinguish the object as a bicycle. Further, an automobile approaching a bicycle equipped with this handlebar from the rear, would not have the benefit of seeing the illumination in time to avoid an accident.

While these units may be suitable for the particular purpose employed, or for general use, they would not be as suitable for the purposes of the present invention as disclosed hereafter.

SUMMARY OF THE INVENTION

It is an object of the invention to produce a bicycle illumination system.

It is a further object of the invention to produce a bicycle illumination system having neon tubes along the frame of the bicycle. These neon tubes allow the frame of the bicycle to be visible during dusk an nighttime hours.

It is a further object of the invention to produce a bicycle illumination device having a power source, namely a rechargeable battery system. The power source allows the neon tubes to be turned off during daytime hours and turned on when it becomes dark.

It is a still further object of the invention to produce a bicycle illumination device in which the frame of the bicycle is coated with phosphorescent paint. Besides adding attractive and fun colors to the bicycle, this paint adds to the visibility of said bicycle. The coated frame also enables a driver to identify the glowing object as a bicycle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
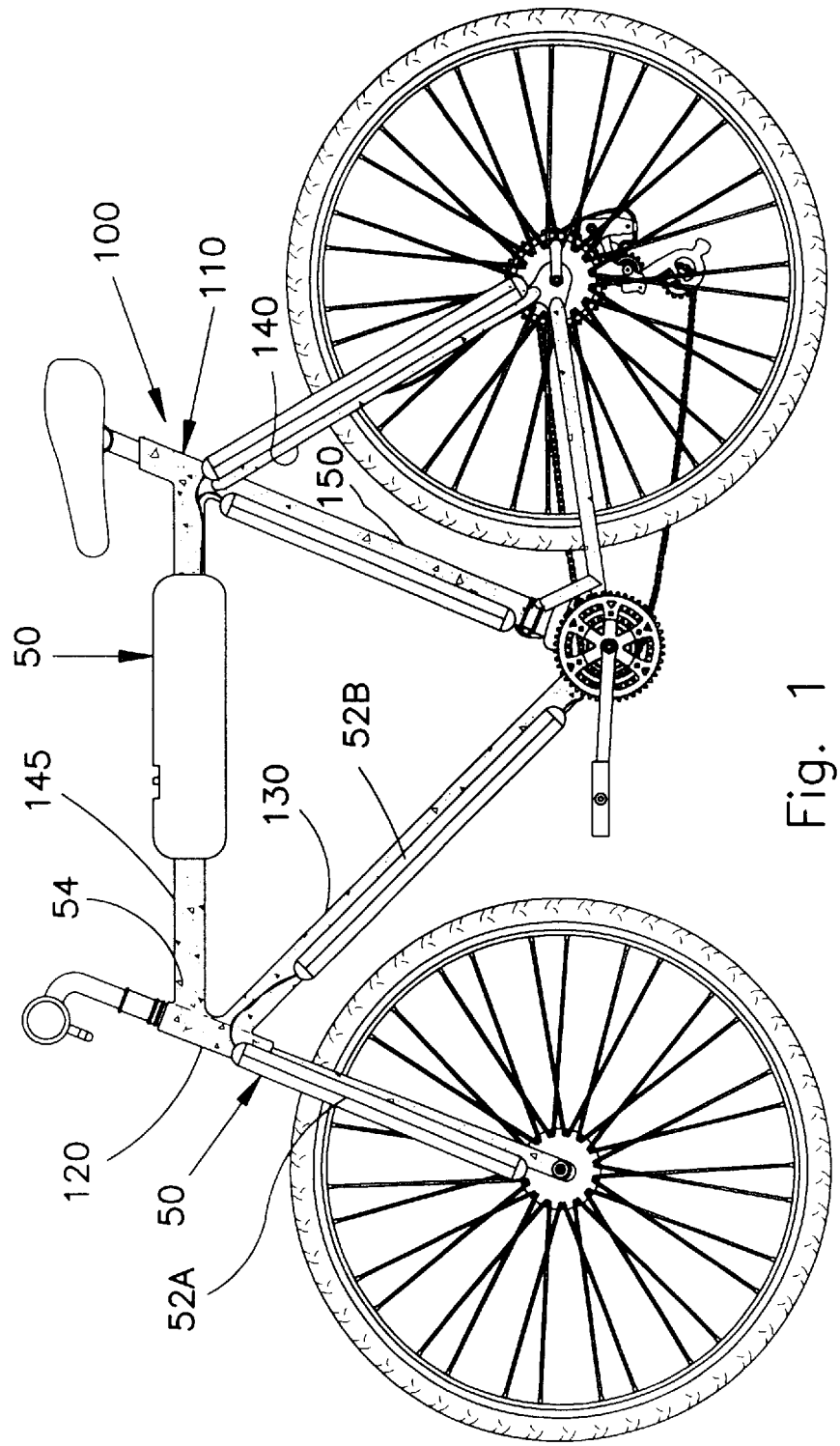
FIG. 1 is a side view of a bicycle with a bicycle illumination system installed thereon.

FIG. 1 illustrates a typical bicycle 100 having a bicycle frame 110 which consists of a fork member 120, a lower frame member 130, a rear axle member 140, a crossbar member 145 and a vertical frame member 150. Typically, to accommodate users who wish to ride their bicycles during nighttime hours when lack of adequate lighting raises safety concerns, many bicycles employ reflectors or small incandescent lights employed at various locations about the bicycle frame 110. Such means often prove inadequate, however, in that they fail to increase the visibility of the bicycle frame 110 to motorists who might be proximal to the bicycle 100 during periods of low light (i.e. dusk, dawn and nighttime). Rather than the motorist observing a distinct bicycle frame 110, he or she observes only a small and indistinguishable light source or reflection and is often left without sufficient time to react properly and avoid the bicycle 100.

The bicycle illumination system 50 of the present invention comprises a plurality of neon light tubes 52 affixed strategically to various members of the bicycle frame 110. In addition, the bicycle illumination system 50 of the present invention also contemplates coating the entire bicycle frame 110 with a phosphorescent coating 54 to further add to the visibility of the bicycle frame 110 during periods of low light.

Figure 2:
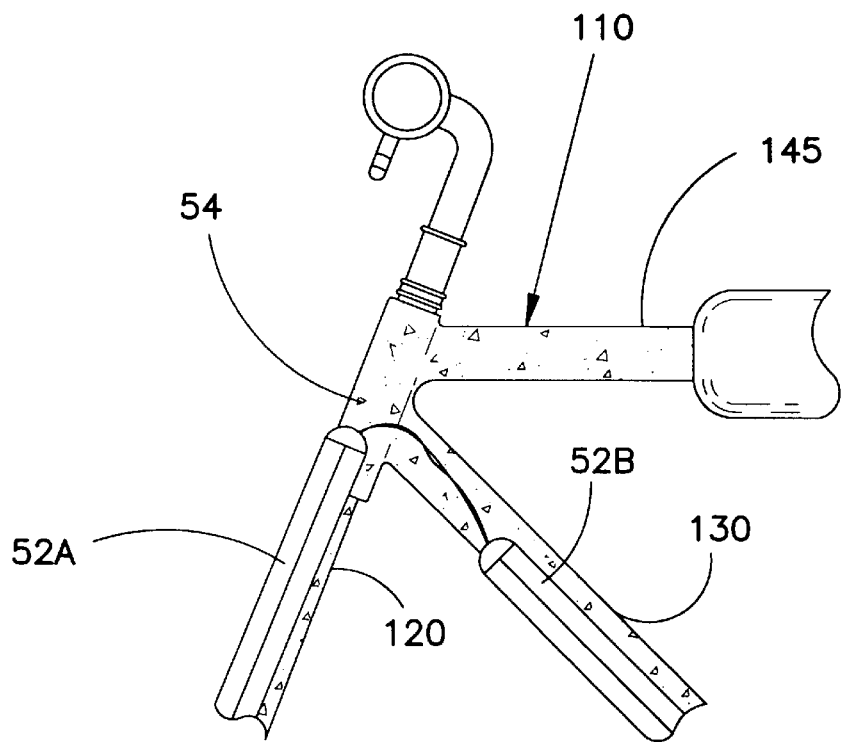
FIG. 2 illustrates a fork member and lower frame member of a bicycle frame, with the bicycle illumination system installed thereon.
Figure 3:
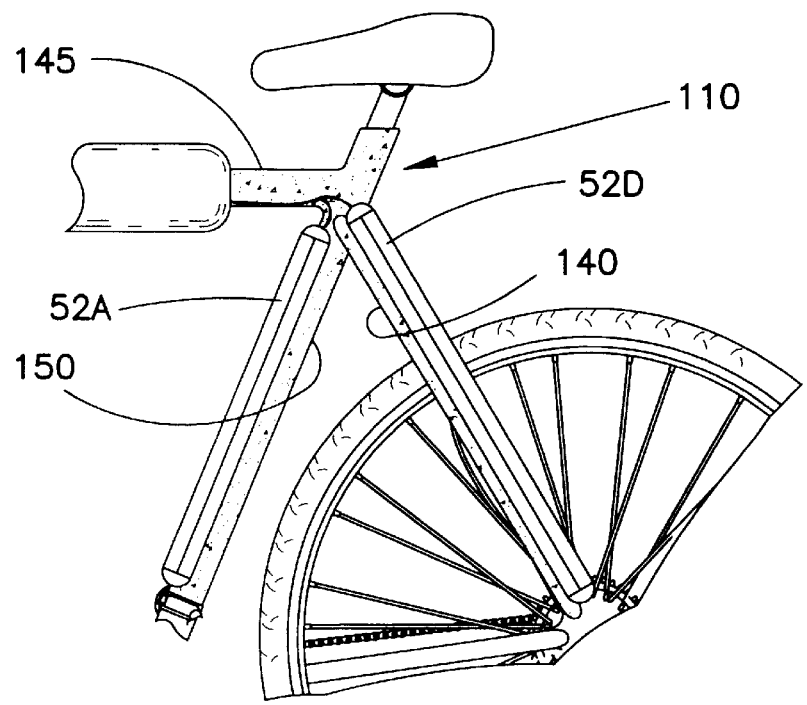
FIG. 3 depicts a rear axle frame member and vertical frame member of the bicycle frame, with the bicycle illumination system also installed thereon.
Figure 4:
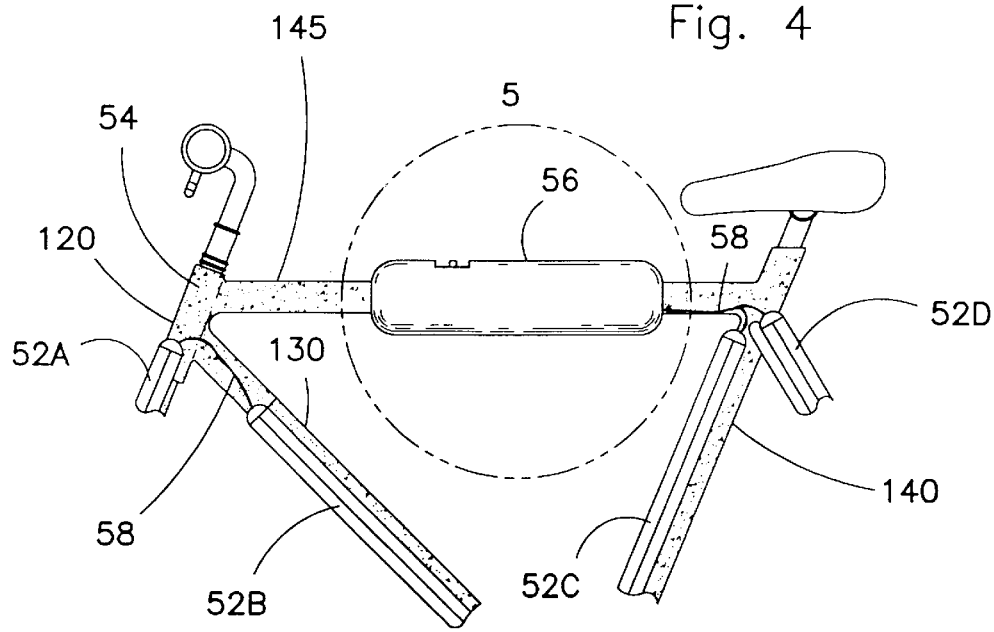
FIG. 4 illustrates a power source for the bicycle illumination system, affixed to a crossbar member of the bicycle frame.
Figure 5:
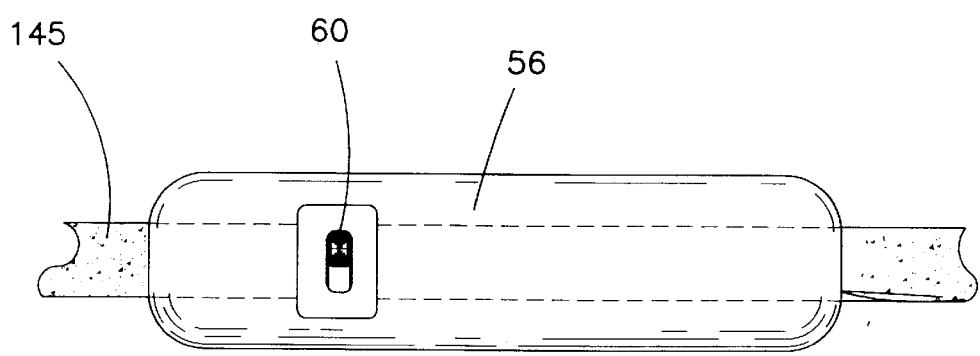
FIG. 5 is an enlarged representation of the power source shown in the circled area of FIG. 4.

As seen by referring to FIGS. 1, 2 and 3 collectively, a fork neon light tube 52A is affixed to the fork member 120 of the bicycle frame 110, and a lower neon light tube 52B is affixed to the lower frame member 130 of the bicycle frame 110. In addition, a vertical member neon light tube 52C is affixed to the vertical member 150 of the bicycle frame 110, while a rear neon light tube 52D is affixed to the rear axle member 140. A power source 56 is affixed to the crossbar member 145 of the bicycle frame 110, said power source 56 supplying energy to each of the neon light tubes 52 in order to illuminate each of said light tubes 52. It is contemplated that the power source comprise a removable, rechargeable battery. The power source 56 is in direct series electrical communication with each of the neon light tubes 52 via a plurality of wires 58. A switch 60 located upon the power source 56 permits an operator to selectively activate and deactivate the illumination of the neon light tubes 52.

When the plurality of neon light tubes 52 is activated, onlookers proximal to the bicycle 100 in settings of low light can clearly visualize the entire bicycle frame 110 since a neon light tube 52 is located upon every major member thereof. The recognizable triangular patterns formed by the plurality of neon lights 52 clearly indicate the familiar form of a bicycle frame 110, and alert proximal motorists to exercise caution. In addition, the phosphorescent coating 54 of the entire bicycle frame 110 accentuates the light which is emitted from the neon light tubes 52 and lends further assistance in distinguishing the bicycle frame 110 and hence entire bicycle 100 in times of low light.

What is claimed is:

1. A bicycle illumination system, for illuminating a frame of a bicycle and hence allowing said bicycle to be visible during periods of low light, the bicycle frame comprising a fork member, lower frame member, rear axle member, crossbar member and vertical frame member, the bicycle illumination system comprising:

a) a plurality of neon light tubes affixed to the bicycle frame consisting of a fork member neon light tube affixed to the fork member, a lower neon light tube affixed to the lower frame member, a vertical member neon light tube affixed to the vertical member, and a rear neon light tube affixed to the rear axle member;

b) a power source, in electrical communication with the plurality of neon light tubes, capable of supplying power thereto and illuminating said neon light tubes; and c) a phosphorescent coating upon the bicycle frame for accentuating the light emitted from the neon light tubes, wherein the bicycle frame is thus further distinguished during periods of low light.

2. The bicycle illumination system of claim 1, wherein the power source comprises a rechargeable battery which is removeably affixed to the crossbar member of the bicycle frame.

* * * * *